United States Patent
Gracie et al.

(10) Patent No.: US 9,795,219 B1
(45) Date of Patent: Oct. 24, 2017

(54) HEAD RESTRAINT TRAVEL ACCESSORY

(71) Applicants: Rener Gracie, Torrance, CA (US); Eve Marie Gracie, Torrance, CA (US)

(72) Inventors: Rener Gracie, Torrance, CA (US); Eve Marie Gracie, Torrance, CA (US)

( * ) Notice: Subject to any disclaimer, the term of this patent is extended or adjusted under 35 U.S.C. 154(b) by 0 days.

(21) Appl. No.: 15/243,876

(22) Filed: Aug. 22, 2016

(51) Int. Cl.
| A47C 7/38 | (2006.01) |
| B64D 11/06 | (2006.01) |
| B61D 33/00 | (2006.01) |
| B60N 2/48 | (2006.01) |

(52) U.S. Cl.
CPC ............ *A47C 7/383* (2013.01); *B60N 2/4805* (2013.01); *B60N 2/4879* (2013.01); *B61D 33/005* (2013.01); *B64D 11/062* (2014.12); *B64D 11/0642* (2014.12)

(58) Field of Classification Search
CPC .. B60N 2/4879; B60N 2/4805; B64D 11/062; B64D 11/0642; A47C 7/383
USPC ......................................... 297/392, 393, 487
See application file for complete search history.

(56) References Cited

U.S. PATENT DOCUMENTS

| 2,796,866 | A | * | 6/1957 | Cohen | A61C 9/00 128/869 |
| 3,359,976 | A | * | 12/1967 | Laval, Jr. | A61F 5/055 602/17 |
| 4,339,151 | A | * | 7/1982 | Riggs | A47C 7/383 297/393 X |
| 5,306,232 | A | * | 4/1994 | Whitmyer | A61F 5/3707 482/10 |
| 5,314,404 | A | * | 5/1994 | Boughner | A61F 5/055 128/876 |
| 5,395,158 | A | * | 3/1995 | Cordia | A61F 5/3707 297/393 |
| 5,511,854 | A | * | 4/1996 | Cordia | A61F 5/3707 297/393 |
| 6,301,716 | B1 | * | 10/2001 | Ross | A61F 5/3707 297/393 X |
| 6,607,245 | B1 | * | 8/2003 | Scher | A47C 7/383 297/393 |
| 8,834,394 | B2 | * | 9/2014 | Ghajar | A61F 5/055 297/393 X |
| 9,566,885 | B2 | * | 2/2017 | Gazit | B60N 2/4879 |
| 2002/0067063 | A1 | * | 6/2002 | Taborro | A47C 7/383 297/397 |
| 2008/0238174 | A1 | * | 10/2008 | Cinquanta | A61F 5/3707 297/397 |

(Continued)

*Primary Examiner* — Rodney B White
(74) *Attorney, Agent, or Firm* — RG Patent Consulting, LLC; Rachel Gilboy

(57) ABSTRACT

A head restraint travel accessory that stabilizes a user's head when sleeping in a seated position. A harness system attaches to a seat or chair using one of two configurations of straps, cobra or butterfly, depending on the construction and size of the seat. Once the harness is attached, an adjustable head restraint band holds the passenger's head in a fixed position and is attached to the harness. A contoured pillow is positioned on top of the harness and is between the harness and the neck and head of the passenger. The head restraint travel accessory is ergonomically designed to hold a person's head and neck in the optimal position for vertebrae alignment when they are sleeping in a chair, so they will not be awakened by the vestibular response that occurs when the head bobs from side to side or front to back thus waking the person.

13 Claims, 6 Drawing Sheets

(56) References Cited

U.S. PATENT DOCUMENTS

| | | | | |
|---|---|---|---|---|
| 2010/0308630 A1* | 12/2010 | Davis | B60N 2/4879 | 297/250.1 |
| 2011/0043025 A1* | 2/2011 | Park | B60N 2/4879 | 297/393 |
| 2013/0020853 A1* | 1/2013 | Gibson | A47C 7/383 | 297/464 |
| 2015/0082515 A1* | 3/2015 | Parziale | A61F 9/04 | 2/173 |
| 2015/0203009 A1* | 7/2015 | Swearingen | B60R 22/001 | 297/392 |
| 2015/0352988 A1* | 12/2015 | Knapp | A41D 1/00 | 297/393 |
| 2015/0375651 A1* | 12/2015 | Palma | B60N 2/4879 | 297/397 X |
| 2016/0250954 A1* | 9/2016 | Gomez | B60N 2/4879 | 297/397 |
| 2017/0050547 A1* | 2/2017 | Dunham | B60N 2/4879 | |

* cited by examiner

US 9,795,219 B1

HEAD RESTRAINT TRAVEL ACCESSORY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of accessories for travelers and more specifically relates to an accessory for restraining the head of a passenger for use when traveling on an airplane, train, or other vehicle. The present invention will keep the user's head in a comfortable vertical position for optimal vertebrae alignment when they are sleeping in an upright seated position.

2. Description of the Related Art

Flying makes travel to faraway destinations more manageable, but this quick method comes with some drawbacks. While sleeping may be the preferred way to pass the time on an airplane trip, the passenger seats today are small and cramped, making it almost impossible to sleep comfortably. Travelers often make use of U-shaped travel pillows to try and stabilize the head and neck for sleeping in an upright position. When a person does manage to drop off to sleep, invariably their head falls forward or from side to side, triggering a vestibular response and awakening the sleeping passenger. Travelers sometimes try to use head restraints as well, but with these devices, the neck is not sufficiently supported and the spine can become out of alignment.

Although the commonly used U-shaped travel pillows and head restraints that some passengers carry help to some extent, they cannot keep the head and neck truly immobilized and in proper alignment to prevent the vestibular response that is triggered when the head of an upright passenger falls forward or side to side and awakens the sleeping passenger. This vestibular response is not triggered when a person is lying down but comes into play when a person tries to sleep when sitting in an upright position. Therefore, the passenger who wants to get forty winks while traveling on an airplane has a very hard time staying asleep in a comfortable position.

Various attempts have been made to solve the above-mentioned problems such as those found in U.S. Pat. No. 8,287,045 to Donohue et al. and U.S. Pat. No. 6,607,245 to Scher. This art is representative of accessories for travelers to keep their head upright while they are asleep. The Donohue et al. device is designed for children in a car seat and lacks the means for a passenger to adjust the support once it is in place. The Scher device also lacks a means to adjust the support once the passenger is seated and does not provide the contoured pillow to support the back of the head and neck. U.S. Pat. No. 6,748,615 to Tiedemann is representative of a pillow used for travelers and does not provide any head restraint. None of the above inventions, publications and patents, taken either singly or in combination, is seen to describe the invention as claimed.

Ideally, an accessory for travelers should provide added comfort, safety and convenience and yet, would operate reliably and be manufactured at a modest expense. Thus, a need exists for a reliable accessory for travelers which would allow the traveler to sleep comfortably while in a seated upright position without being awakened by the vestibular response which is triggered when a traveler's head falls from side to side or forward and which would keep the traveler's neck in proper alignment.

BRIEF SUMMARY OF THE INVENTION

In view of the foregoing disadvantages inherent in the known travel accessory art for sleepers, the present invention provides a novel head restraint system which will keep a traveler comfortable and safe while sleeping keeping the neck supported in proper alignment and which is used with at least two different styles of airplane seats. The present invention can be used not only on airplanes but on trains, busses or any mode of travel where upright sleeping is desired. The present invention can also be used in any environment where it is advantageous to keep the head in a restrained yet comfortable position while keeping the neck supported in comfortable alignment with the spinal column. The benefits of using the present travel accessory invention will be greatly appreciated by all those who fly or want to get a nap while riding on a train or bus. It can also be used to help employees maintain optimal postures while using a computer and in medical facilities to assist patients with neck injuries or acid-reflux digestive ailments during seated sleep.

The present invention relates to travel accessories and more particularly to travel accessories used when sleeping in an upright position. The present invention employs a harness system that comfortably stabilizes a user's head when sleeping in a seated position. The harness system attaches to a seat or chair using one of two configurations of straps depending on the construction and size of the seat. Once the harness is attached, the head restraint band holds the passenger's head in a fixed position and is attached to the harness. A contoured pillow is positioned on top of the harness and is between the harness and the neck and head of the passenger.

The present invention is designed to not interfere with other passengers. The straps employed do not engage any area of the rear of the seat that may hold a viewing screen. The present invention can be used whether the seat reclines or not thereby giving the passenger the best opportunity for comfortable uninterrupted sleep.

The present invention holds significant improvements and serves as a head restraint system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention head restraint travel accessory constructed and operative according to the teachings of the present invention.

DETAILED DESCRIPTION

As discussed above, embodiments of the present invention relates to a head-restraint device and more particularly to an ergonomically designed to hold a person's head and neck in the optimal position for vertebrae alignment when they are sleeping in a chair, so they will not be awakened by the vestibular response that occurs when the head bobs from side to side or front to back thus waking the person. Also, a passenger using the present invention will not experience a sore neck when they awaken. The present invention is comprised of a harness, a contoured pillow and a head restraint band. The harness can be used in two configurations, cobra and butterfly, depending on the type of seat.

When there is no built-in headrest on the seat, the present invention is attached to the seat using the cobra harness configuration. In this configuration, the ends of the long strap are attached to two wing-shaped straps. Each wing-shaped strap has two adjustment points. The long strap is wrapped around the back of the seat. The wing-shaped straps are hooked/wrapped over the right and left corners of the seat. Each adjustment point is adjusted for tightness to lock the harness into position.

When the seat has a built-in adjustable headrest, as do many airplane seats, then the butterfly harness configuration is used wherein a long adjustable fabric strap with a male/female connection is wrapped around the built-in adjustable head rest in a figure eight configuration. The ends of the strap are then connected. The long strap is then tightened to alter the diameter of the strap to ensure a snug fit around the built-in headrest.

In either the cobra or butterfly harness configurations, the head restraint band is then attached to the harness and the contoured pillow is inserted between the head restraint band and the harness. In either the cobra harness configuration or the butterfly harness configuration, the head restraint band is adjustable and is attached to the harness using a simple hooking mechanism. The contoured pillow is placed behind the head to provide optimal alignment of the neck and spinal vertebrae. The user places the head restraint band over their forehead and uses a pull cord on each side of the head restraint band to adjust to the desired tightness. Further details will be provided in the following paragraphs.

Figure 9:
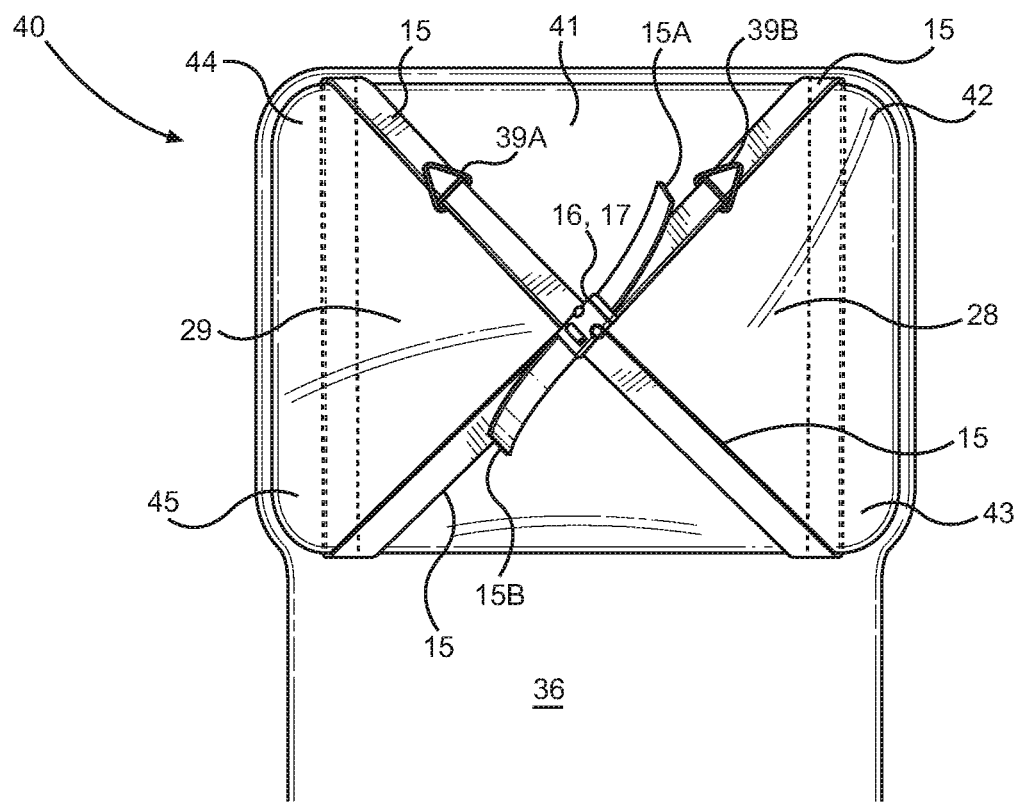
FIG. 9 is a front view of the butterfly harness configuration with the contoured pillow.

Referring to the drawings by numerals of reference, there is shown in FIGS. 1-5, an illustration of a passenger 32 in an airplane seat 36 using the cobra harness configuration 1 of the present invention. It should be noted here that an airplane seat 36 is referred to for purposes of illustration, however the present device can be used with any vehicle seat or even a stationary seat. The basic airplane seat 36 has a front side 35, a right upper edge 27, a left upper edge 34, a right side 38, a left side 37, and a back side 33. The cobra harness configuration 1 is used when the airplane seat 36 has no built-in adjustable headrest as shown in FIGS. 1-5. The butterfly harness configuration is shown in FIGS. 6-9. The butterfly harness configuration is used when the airplane seat 36 does have a built-in adjustable headrest 41. An airplane seat 36 with a built-in adjustable headrest 41 is shown in FIG. 9 and has a right section 28 and a left section 29. The right section 28 of the built-in adjustable headrest 41 has a right upper edge 42 and a right lower edge 43. The left side 29 of the built-in adjustable headrest 41 has a left upper edge 44 and a left lower edge 45.

Both the cobra 1 and the butterfly 40 harness configurations employ either side release male/female buckle connectors or center release male/female buckle connectors. Both the cobra 1 and butterfly 40 configurations employ strap adjuster connectors. Both the cobra 1 and butterfly 40 configurations employ sliding loops. In all cases, the connectors are of a very thin profile. The head restraint band 19 employs adjustable cord locks 20, 22 at either end that are either spring biased or wheeled cam. All of the connectors will be discussed in further detail in the following paragraphs.

Figure 4:
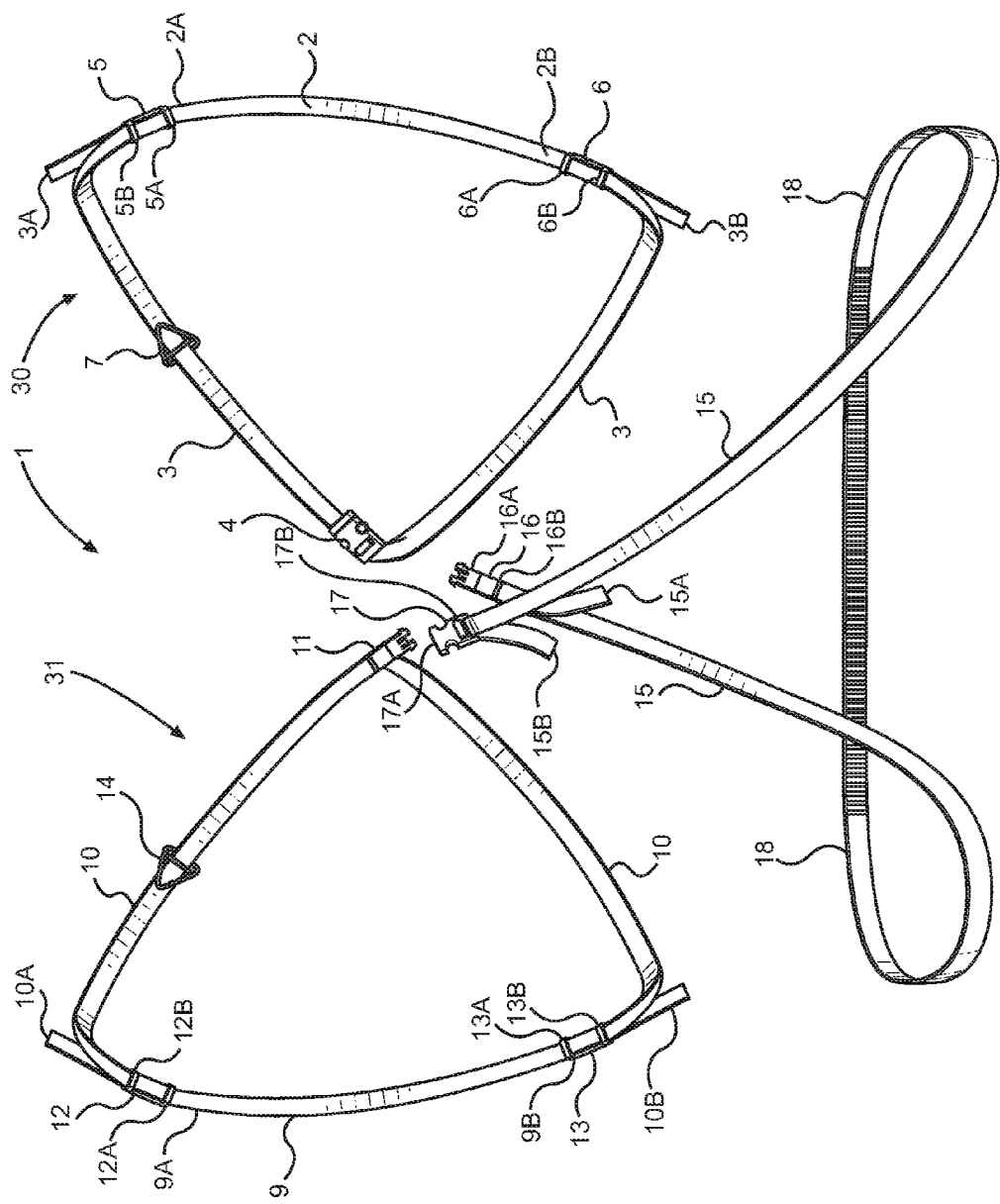
FIG. 4 is a front schematic view of the cobra harness configuration of the present invention.
Figure 5:
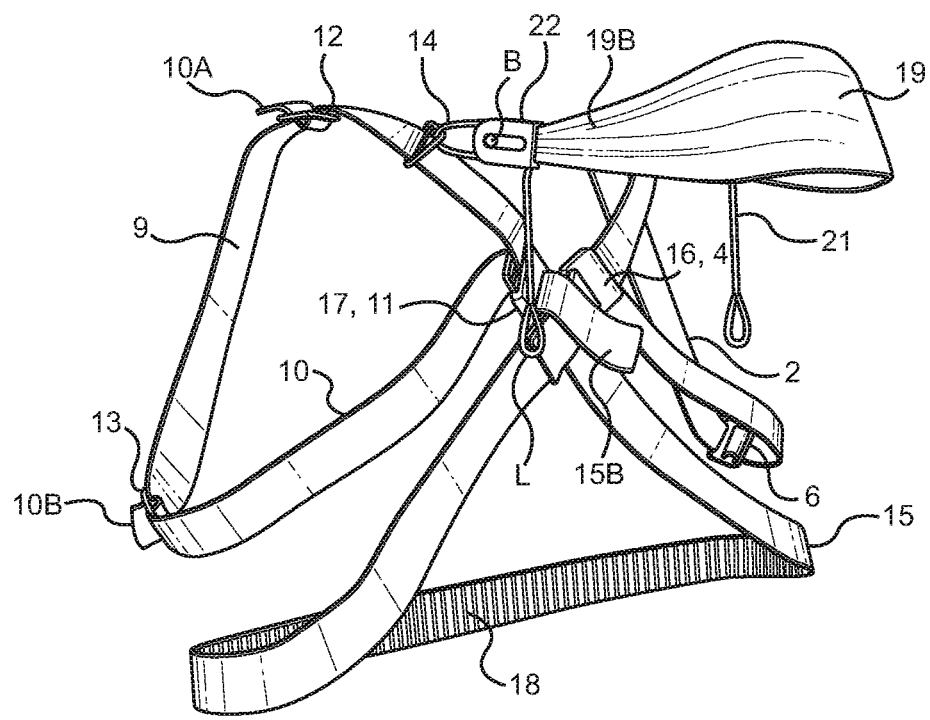
FIG. 5 is a front left side schematic view of the cobra harness configuration of the present invention with the head restraint connected.
Figure 6:
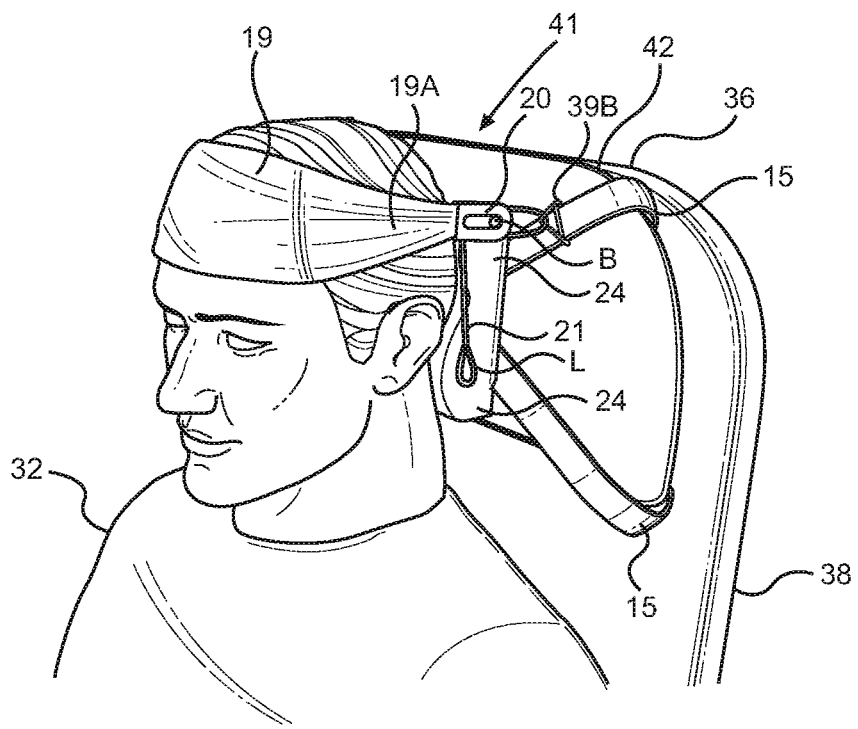
FIG. 6 is a front right side view of a passenger seated in an airplane seat using the butterfly harness configuration of the present invention.
Figure 7:
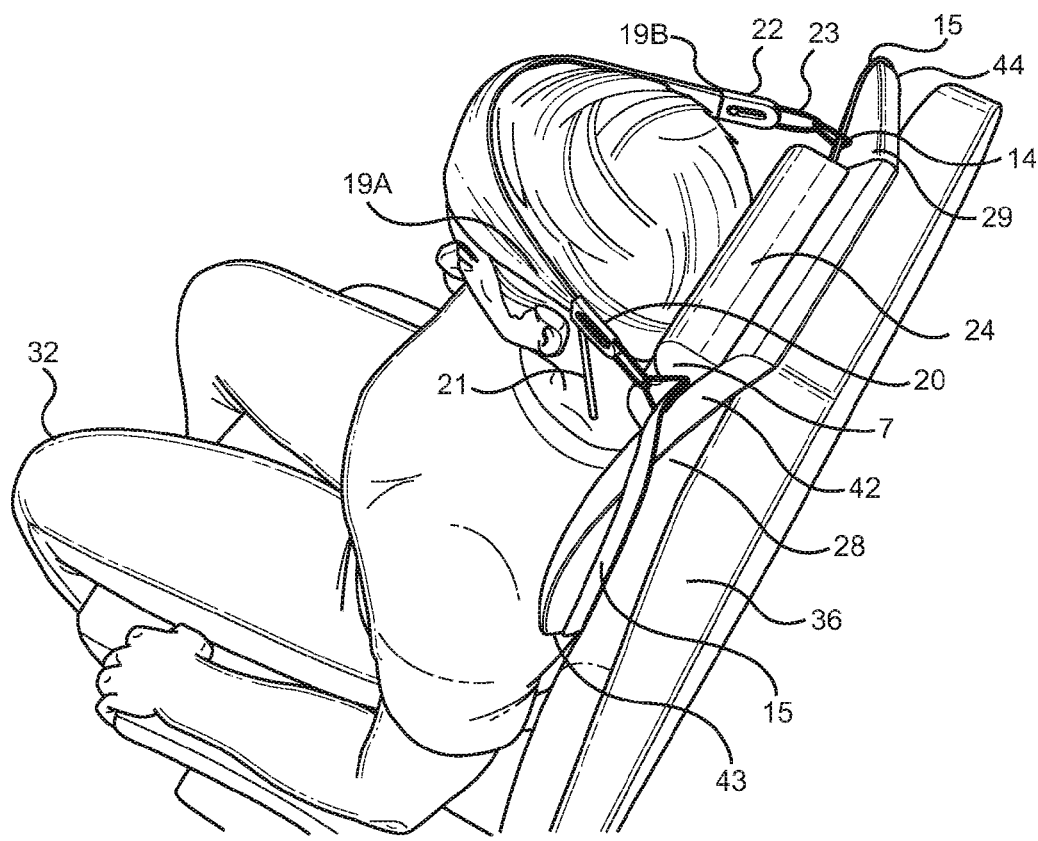
FIG. 7 is a right side and partial rear view of a passenger using the butterfly harness configuration.
Figure 8:
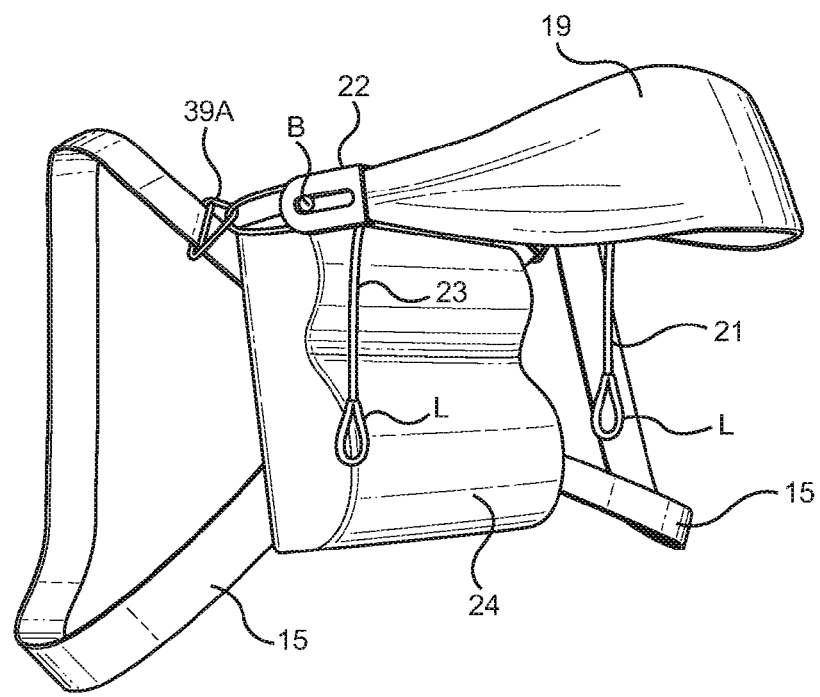
FIG. 8 is a schematic front view of the butterfly harness configuration with the contoured pillow and head restraint in place.

The details of the cobra harness configuration 1 is better illustrated in FIG. 4. The cobra harness 1 comprises a right wing 30 and a left wing 31. The right wing 30 comprises a right fabric strap section 3 and an elastic strap such as a right rubber strap section 2 joined together in series to form a loop and when used on an airplane seat 36, this loop looks a bit like a wing as seen in FIG. 4. The right rubber strap section 2 has a first end 2A and a second end 2B. The right fabric strap section 3 has a first end 3A and a second end 3B. The right wing 30 further includes a first right wing strap adjuster connector 5 and a second right wing strap adjuster connector 6. The first right wing strap adjuster connector 5 has a first end 5A and a second end 5B. The first end 5A of the first right wing strap adjuster connector 5 is fixedly attached to the first end 2A of the right rubber strap section 2, and the second end 5B of the first right wing strap adjuster connector 5 is configured to provide sliding adjustability of the first end 3A of the right fabric strap section 3 for the purpose of snuggly adjusting the right wing 30 to the airplane seat 36. The right rubber strap section 2 has a logo designating "right side" to facilitate the placement of the cobra harness 1 on the airplane seat 36. The right fabric strap section 3 further has a sliding female buckle connector 4 which slides freely on the right fabric strap section 3. To the right side of sliding female buckle connector 4 is a right sliding loop 7.

The second right wing strap adjuster connector 6 has a first end 6A and a second end 6B. The first end 6A of the second right wing strap adjuster connector 6 is fixedly attached to the second end 2B of the right rubber strap section 2. The second end 6B of the second right wing strap adjuster connector 6 is configured to provide sliding adjustability of the second end 3B of the right fabric strap section 3 for the purpose of snuggly adjusting the right wing 30 to the airplane seat 36.

The left wing 31 of the cobra harness 1 is similar to the right wing 30. The left wing 31 has a left fabric strap section 10 and an elastic strap such as a left rubber strap section 9 joined together in series to form a loop. The left fabric strap section 10 has a sliding male buckle connector 11 and a left sliding loop 14 positioned to the left of the sliding male buckle connector 11. The left rubber strap section 9 has a first end 9A and a second end 9B. The left fabric strap section 10 has a first end 10A and a second end 10B. The left wing 31 has a first left wing strap adjuster connector 12 having a first end 12A and a second end 12B. The first end 12A of the first left wing strap adjuster connector 12 is fixedly attached to the first end 9A of the left rubber strap section 9. The second end 12B of the first left wing strap adjuster connector 12 is configured to provide sliding adjustability of the first end 10A of the left fabric strap section 10 for the purpose of snuggly adjusting the left wing 31 to the airplane seat 36.

The second left wing strap adjuster connector 13 has a first end 13A and a second end 13B. The first end 13A of the second left wing strap adjuster connector 13 is fixedly attached to the second end 9B of the left rubber strap section 9. The second end 13B of the second left wing strap adjuster connector 13 is configured to provide sliding adjustability of the second end 10B of the left fabric strap section 10 for the purpose of snuggly adjusting the left wing 31 to the airplane seat 36.

The cobra harness 1 further includes a long fabric strap 15 having rubber grips 18 along its length on one side for the purpose of more securely engaging the airplane seat 36. The long fabric strap 15 has a first end 15A and a second end 15B. The first end 15A of the long fabric strap 15 has a male buckle connector 16. The second end 15B of the long fabric strap 15 has a female buckle connector 17. The male buckle connector 16 has a first end 16A and a second end 16B. The first end 16A is a male protrusion. The second end 16B is configured for adjustable engagement with the first end 15A of the long fabric strap 15. The female buckle connector 17 has a first end 17A which is a female receptacle and a second end 17B which is configured for adjustable engagement with the second end 15B of the long fabric strap 15. The long fabric strap 15 can have a first sliding loop 38A and a second sliding loop 39B which will be discussed in detail further on.

Figure 1:
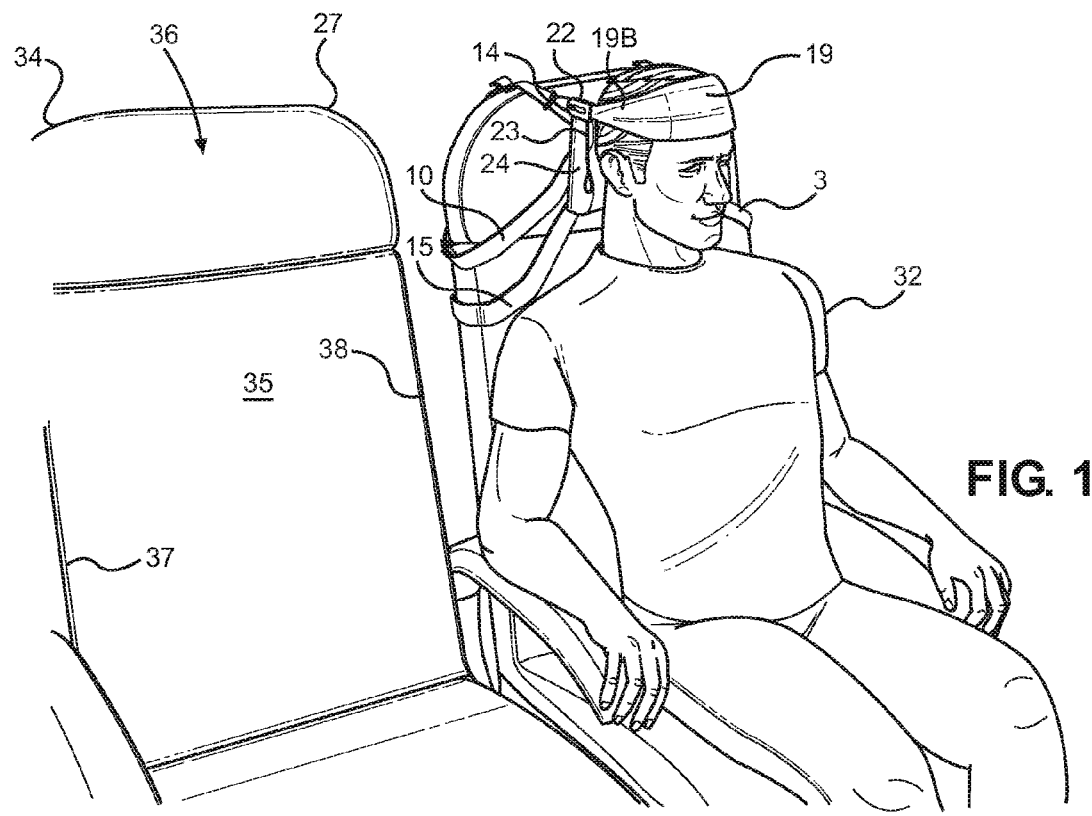
FIG. 1 shows a front perspective view illustrating a passenger seated in an airplane seat using the cobra harness configuration of the present invention.
Figure 2:
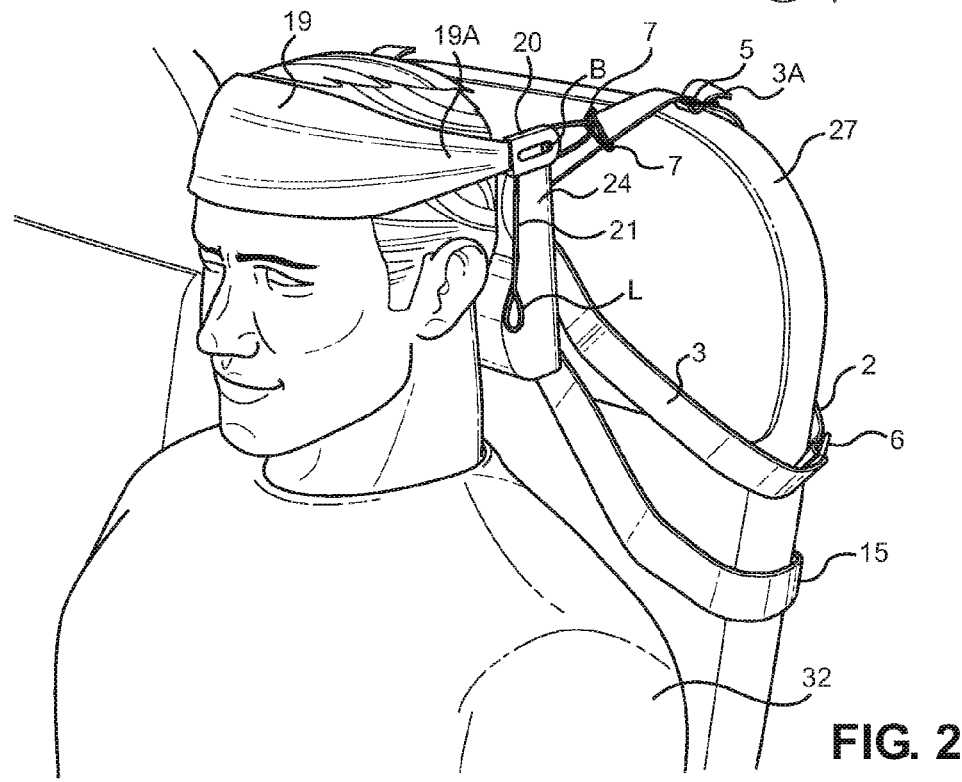
FIG. 2 is a side view of a passenger seated in an airplane seat using the cobra harness configuration of the present invention.
Figure 3:
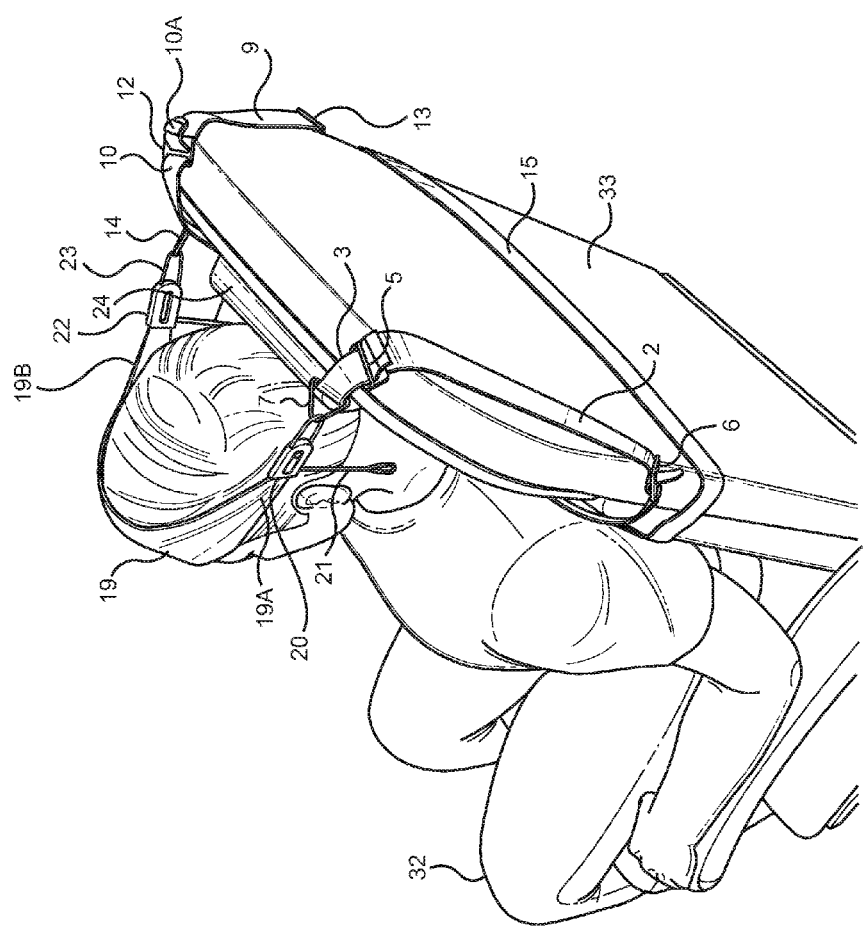
FIG. 3 is a right side rear view of a passenger seated in an airplane seat using the cobra harness configuration of the present invention.

To use the cobra harness 1, the right wing 30 is affixed to the upper right edge 27 of the airplane seat 36 by looping it up over and around the upper right edge 27 of the seat 36 in a manner best seen in FIG. 2. The right rubber strap section 2 of the right wing 30 engages the right upper edge 27 of the seat 36 providing a non-slip engagement. The right fabric strap section 3 of the right wing 30 is brought to the front side 35 of the airplane seat 36. The male buckle connector 16 of the long fabric strap 15 is connected to the sliding female buckle connector 4 of the right wing 30. The female buckle connector 17 of the long fabric strap 15 is connected to the sliding male buckle connector 11 of the left wing 31. Thereafter, the long fabric strap 15 and the left wing 31 are together wrapped around the left side 37 of the airplane seat 36 and then wrapped around the back side 33 of the airplane seat 36 and then brought around the right side 38 of the airplane seat 36. Then the left wing 31 is looped up over and around the left upper edge 34 of the airplane seat 36 with the left rubber strap section 9 engaging the rear of the upper left edge 34 of the airplane seat 36. All of the straps are adjusted as described in the preceding paragraphs to snug the harness 1 to the airplane seat 36.

The butterfly harness configuration 40 is used when there is a built-in adjustable headrest 41 on the airplane seat 36. The butterfly harness 40 is best illustrated in FIGS. 6-9. To use the long fabric strap 15 for the butterfly harness 40 configuration, the long fabric strap 15 is wrapped in a figure eight configuration as follows. The first end 15A is placed generally in the center of the adjustable built-in headrest 41, then the long fabric strap 15 is wrapped diagonally up around the right upper edge 42 of the built-in adjustable headrest 41 and the long fabric strap 15 is wrapped vertically downward and behind the right section 28 of the adjustable built-in headrest 41 and wrapped about the right lower edge 43 so as to be in front of the built-in adjustable headrest 41. Next the long fabric strap 15 is wrapped diagonally upward around the left upper edge 44 of the built-in adjustable headrest 41 and is wrapped vertically downward and behind the left section 29, and then wrapped about the left lower edge 45 of the built-in adjustable headrest 41. The long fabric strap 15 is brought up diagonally towards the center of the adjustable built-in headrest 41. The male buckle connector 16 is then connected to the female buckle connector 17 of the long fabric strap 15. The first and second ends 15A and 15B of the long fabric strap 15 are pulled to tighten the butterfly harness configuration 40 around the built-in adjustable headrest 41 as shown in FIG. 9. The sliding loop connectors 39A and 39B of the long fabric strap 15 are positioned near the top of the headrest 41. The second sliding loop 39B is positioned near the upper right edge 42 of the built-in adjustable headrest 41. The first sliding loop 39A is positioned near the upper left edge 44 of the built-in adjustable headrest 41.

Figure 10:
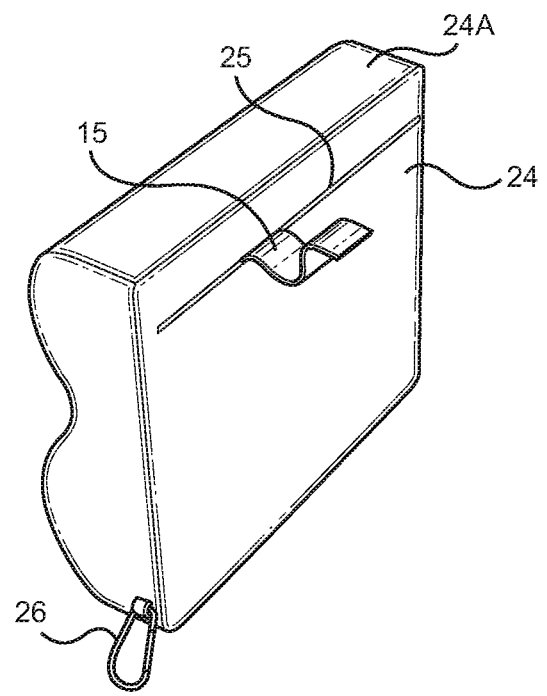
FIG. 10 is a rear and partial side view of the contoured pillow used with both the cobra and butterfly harness configurations.

FIG. 10 shows the contoured pillow 24 which is used with both the cobra harness 1 and the butterfly harness 40. The contoured pillow 24 has a cover 24A. On the rear of the pillow cover 24A is a zipper 25 providing access to the contoured pillow 24. There is a pouch within the pillow cover 24A to store and carry the harness 1. A carabiner 26 is provided on the side of the cover 24A so that the contoured pillow 24 may be clipped onto a backpack or carry-on bag. How the contoured pillow 24 is used with either harness will be discussed in the following paragraphs.

FIGS. 1-3, 5 show the head restraint band 19 attached to the sliding loop connectors 7, 14 by adjustable cord lock connectors 20 and 22. The adjustable cord lock connectors 20,22 have a slotted housing having upper and lower inclined channels and a cam wheel having a protrusion B received in the slot for selectively engaging the cord. The head restraint band 19 has a right end 19A and a left end 19B. The adjustable right cord lock connector 20 is connected to the right end 19A of head restraint band 19. A right pull cord 21 is fixedly attached to one end of the right cord lock connector 20. The free end of the right pull cord 21 is threaded through the right sliding loop 7 on the right wing 30 then back through the right cord lock connector 20 where it selectively engages the wheel. The free end of the right pull cord 21 exits the right cord lock connector 20 and hangs near the ear of the passenger 32. The right pull cord 21 can be easily reached and pulled to tighten the head restraint band 19 to the cobra harness 1.

The adjustable left cord lock connector 22 is connected to the left end 19B of head restraint band 19. A left pull cord 23 is fixedly attached to one end of the left cord lock connector 22. The free end of left pull cord 23 is threaded through the right sliding loop 14 on the left wing 31 then back through the left cord lock connector 22 where it selectively engages the cam wheel. The free end of the pull cord 23 exits the left cord lock connector 22 and hangs near the ear of the passenger 32. The left pull cord 23 can be easily reached and pulled to tighten the head restraint band 19 to the cobra harness 1. The protrusion B when pushed will allow either of their respective pull cords to be loosened. On both of the pull cords 21 and 23 there is a loop L at the free end that the passenger 32 can grasp with a finger.

The contoured pillow 24 is then placed between the head restraint band 19 and the cobra harness 1. The contoured pillow 24 will be loosely supported at this point against the cobra harness 1 by the head restraint band 19 and will hang there without slipping out. The passenger 32 then sits down onto airplane seat 36, places their head against the contoured pillow 24, adjusting the contours to fit the head and neck comfortably, and then pulls the head restraint band 19 across the top of their head and onto their forehead. The passenger 32 then pulls on adjustment cords 21 and 23 connected to adjustable cord lock connectors 20 and 22 to snug the head restraint band 19 and head against the contoured pillow 24 thereby providing optimal alignment of the neck and spinal column while the passenger 32 catches forty winks. The head restraint band 19 is made of a rayon/cotton blend which stretches and conforms perfectly to every square inch of the portion of the forehead and head of the passenger 32 which is supported.

If the passenger 32 needs to get up and move around the airplane for any reason, the head restraint band 19 is just pulled up out of the way. The contoured pillow 24 is still held in place by the head restraint band 19 until the passenger is ready to be seated again. The contoured pillow 24 is not attached to the cobra harness 1 but is held loosely in place by the head restraint band 19 until needed by the passenger 32. When the passenger 32 is seated and using the head restraint band 19, the contoured pillow 24 is adjusted by the passenger 32 for maximum support and comfort.

The head restraint band 19 is attached to and used with the butterfly harness 40 in the same manner as for the cobra harness 1 except that the adjustment cords 21 and 23 are attached to the sliding loops 39A and 39B of the butterfly harness 40. The contoured pillow 24 is used with the butterfly harness 40 and head restraint band 19 in the same manner as with the cobra harness 1.

Upon reading this specification, it should be appreciated that, under appropriate circumstances, considering such issues as design preference, user preferences, marketing preferences, cost, structural requirements, available materials, technological advances, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed as new and desired to be protected by Letters Patent is set forth in the appended claims:

1. A head restraint travel accessory for a passenger sleeping in a seated position in a vehicle seat, said vehicle seat having an upper right edge, an upper left edge, a front side, a rear side, a right side and a left side, said head restraint travel accessory comprising:
   a harness, said harness comprising:
      a right wing, said right wing comprising:
         a right fabric strap section and a right elastic strap section, said right fabric strap section and said right elastic strap section joined together in series to form a loop, a sliding female buckle connector slidably disposed on said right fabric strap section, and a right sliding loop slidably disposed on said right fabric strap section;
      a left wing, said left wing comprising:
         a left fabric strap section and a left elastic strap section joined together in series to form a loop, a sliding male buckle connector slidably disposed on said left fabric strap section, a left sliding loop slidably disposed on said left fabric strap section;
         a long fabric strap, having a first end and a second end, said first end having a male buckle connector configured to selectively connect to said sliding female buckle connector of said right wing, said second end having a female buckle connector configured to selectively connect to said sliding male buckle connector of said left wing;
   a head restraint band comprising:
      a length of fabric material having a right end and a left end, said right end having connected thereto a right adjustable cord lock, said left end being operably connected to said left wing;
   a right pull cord having an end fixed to said right adjustable cord lock and being threaded through said right sliding loop of said right wing back through said right adjustable cord lock terminating in a free end so as to be easily reached and pulled to tighten said head restraint band; and
   an inflatable contoured pillow configured to be positioned between said harness and said head restraint band;
wherein said right wing is configured to be looped over and around said upper right edge of said vehicle seat, said left wing is configured to be looped over and around said upper left edge of said vehicle seat, said long fabric strap is configured to wrap around said rear side of said vehicle seat with said first end of said long fabric strap disposed on said front side of said vehicle seat and connected to said right wing and said second end of said long fabric strap disposed on said front side of said vehicle seat and connected to said left wing.

2. The head restraint travel accessory of claim 1, wherein said left end of said head restraint band has connected thereto a left adjustable cord lock, and a connection of said left end of said head restraint band to said left wing comprising a left pull cord having an end fixed to said left adjustable cord lock and being threaded through said left sliding loop of said left wing and back through said left adjustable cord lock terminating into a free end so as to be easily reached and pulled to further tighten said head restraint band.

3. The head restraint travel accessory of claim 1 wherein said right elastic strap section has a first end and a second end, and wherein said right fabric strap section has a first end and a second end and wherein said right wing further includes a first right wing strap adjuster connector and a second right wing strap adjuster connector;

said first right wing strap adjuster connector having a first end and a second end,
wherein said first end of said first right wing strap adjuster connector is fixedly attached to said first end of said right elastic strap section and said second end of said first right wing strap adjuster connector is configured to provide adjustability of said first end of said right fabric strap section for snuggly adjusting said right wing to said vehicle seat;
said second right wing strap adjuster connector has a first end and a second end,
wherein said first end of said second right wing strap adjuster connector is fixedly attached to said second end of said right elastic strap section and said second end of said second right wing strap adjuster connector is configured to provide adjustability of said second end of said right fabric strap section for snuggly adjusting said right wing to said vehicle seat.

4. The head restraint travel accessory of claim 3 wherein said left elastic strap section has a first end and a second end, and wherein said left fabric strap section has a first end and a second end and wherein said left wing further includes a first left wing strap adjuster connector and a second left wing strap adjuster connector:

said first left wing strap adjuster connector has a first end and a second end,
wherein said first end of said first left wing strap adjuster connector is fixedly attached to said first end of said left elastic strap section and said second end of said first left wing strap adjuster connector is configured to provide adjustability of said first end of said left fabric strap section for snuggly adjusting said left wing to said vehicle seat;
said second left wing strap adjuster connector has a first end and a second end,
wherein said first end of said second left wing strap adjuster connector is fixedly attached to said second end of said left elastic strap section and said second end of said second left wing strap adjuster connector is configured to provide adjustability of said second end of said left fabric strap section for snuggly adjusting said left wing to said vehicle seat.

5. The head restraint travel accessory of claim 1, wherein said long fabric strap further includes rubber grips along its length on one side for securely engaging said vehicle seat.

6. The head restraint travel accessory of claim 1, wherein said male buckle connector and said female buckle connector of said long fabric strap are configured to allow adjustability of length for snuggly adjusting said long fabric strap together with said right wing and said left wing to said vehicle seat.

7. The head restraint travel accessory of claim 1, wherein said inflatable contoured pillow comprises a cover having disposed therein an inflatable bladder, said cover having a zipper providing selective access to said inflatable bladder, said inflatable bladder when deflated providing room within said cover to store said harness and said head restraint band.

8. The head restraint travel accessory of claim 7, wherein said inflatable contoured pillow comprises a carabiner for clipping onto a backpack or a carry-on bag.

9. A head restraint travel accessory for a passenger sleeping in a seated position in a vehicle seat, said vehicle seat having an adjustable built-in headrest, said adjustable built in headrest having a right section, a left section, a right upper edge, a right lower edge, a left upper edge and a left lower edge, said head restraint travel accessory comprising:

a harness, said harness comprising:
a long fabric strap, said long fabric strap having a first end and a second end, said first end of said long fabric strap having attached thereon a male connector, said male connector having a first end and a second end, said first end of said male connector having a male protrusion, said second end of said male connector configured for adjustable engagement with said first end of said long fabric strap, said second end of said long fabric strap having attached thereon a female connector, said female connector having a first end and a second end, said first end of said female connector having a female receptacle, said second end of said female connector configured for adjustable engagement with said second end of said long fabric strap, said long fabric strap further having a first sliding loop and a second sliding loop disposed thereon;
a head restraint band comprised of
a length of fabric material having a right end and a left end, said right end having connected thereto a right adjustable cord lock, said left end operably connected to said first sliding loop;
a right pull cord having an end fixed to said right adjustable cord lock and being threaded through said second sliding loop and back through said right adjustable cord lock terminating into a free end so as to be easily reached and pulled to tighten said head restraint band; and
an inflatable contoured pillow configured to be positioned between said harness and said head restraint band,
wherein said long fabric strap is configured to be wrapped diagonally up around said right upper edge of said built-in headrest, vertically downward and behind said right section of said built-in headrest, about said right lower edge of said built-in headrest so as to be in front of said built-in headrest, wrapped diagonally upward around said left upper edge of said built-in headrest, vertically downward and behind said left section of said built-in headrest, wrapped about said left lower edge of said built-in headrest so as to be in front of said built-in headrest such that said male buckle connector is configured to be connected to said female buckle connector thereby providing snug engagement of said harness with said built-in headrest.

10. The travel accessory of claim 9, wherein said long fabric strap further includes rubber grips along its length for securely engaging said vehicle seat.

11. The head restraint travel accessory of claim 9, wherein said left end of said head restraint band has connected thereto a left adjustable cord lock, and a connection of said left end of said head restraint band to said first sliding loop comprising a left pull cord having an end fixed to said left adjustable cord lock and being threaded through said first sliding loop and back through said left adjustable cord lock terminating into a free end so as to be easily reached and pulled to further tighten said head restraint band.

12. The head restraint travel accessory of claim 9, wherein said inflatable contoured pillow includes a cover having disposed therein an inflatable bladder, said cover having a zipper providing selective access to said inflatable bladder, said inflatable bladder when deflated providing room within said cover to store said harness and said head restraint band.

13. The head restraint travel accessory of claim 12, wherein said inflatable contoured pillow comprises a carabiner for clipping onto a backpack or a carry-on bag.

* * * * *